US012248940B2

(12) United States Patent
Dipasquale

(10) Patent No.: US 12,248,940 B2
(45) Date of Patent: Mar. 11, 2025

(54) DYNAMIC LEDGER ADDRESS MASKING

(71) Applicant: Nick Dipasquale, Austin, TX (US)

(72) Inventor: Nick Dipasquale, Austin, TX (US)

(73) Assignee: Tessera IP Holdings, LLC, Liberty Hill, TX (US)

( * ) Notice: Subject to any disclaimer, the term of this patent is extended or adjusted under 35 U.S.C. 154(b) by 0 days.

(21) Appl. No.: 17/512,656

(22) Filed: Oct. 27, 2021

(65) Prior Publication Data

US 2022/0138760 A1 May 5, 2022

Related U.S. Application Data

(60) Provisional application No. 63/106,229, filed on Oct. 27, 2020.

(51) Int. Cl.

*G06Q 20/40* (2012.01)
*G06Q 20/22* (2012.01)
*G06Q 20/38* (2012.01)

(52) U.S. Cl.

CPC ..... *G06Q 20/40975* (2013.01); *G06Q 20/223* (2013.01); *G06Q 20/38215* (2013.01); *G06Q 20/3823* (2013.01); *G06Q 20/4014* (2013.01)

(58) Field of Classification Search

None
See application file for complete search history.

(56) References Cited

U.S. PATENT DOCUMENTS 10,600,050 B1 * 3/2020 Anton .................. H04L 9/3255
2017/0244727 A1 * 8/2017 Thomas ................ G06Q 20/10
2019/0172038 A1 * 6/2019 Dunjic .................. G06Q 20/10
2020/0311304 A1 * 10/2020 Parthasarathy ..... G06F 11/3006
2020/0311721 A1 * 10/2020 Ow ....................... G06Q 20/02
2021/0119807 A1 * 4/2021 Chen .................... H04L 9/3242

FOREIGN PATENT DOCUMENTS

EP 2723033 B1 * 4/2019 ............ G06F 21/10
WO WO-2021041746 A1 * 3/2021 ......... G06F 21/6254

OTHER PUBLICATIONS

Oyewole, A. O., "Consumer Preference: A Study of Mobile Digital Wallet", Capitol Technology University, ProQuest Dissertations & Theses. (2018) (Year: 2018).*

* cited by examiner

*Primary Examiner* — Clay C Lee
(74) *Attorney, Agent, or Firm* — Caldwell Intellectual Property Law

(57) ABSTRACT

A ledger based dynamic digital address masking solution for reducing vulnerability of private cryptographic keys used during digital transactions. Tokenized digital transaction addresses may be stored in association with an actual distributed ledger reference address. The tokenized transaction address, or recipient token, may be used to complete a variety of transactions for digital asset exchange without exposing the transaction address's actual reference address on the distributed ledger.

20 Claims, 10 Drawing Sheets

100
Issuer
106
Asset Manager
108
Network
104
User 1
102A
Transaction Address
122A
Digital Ledger
120A
User 2
102B
Transaction Address
122B
Digital Ledger
120B 300
302
312
316
Memory
Database Engine
Distributed Ledger
BUS
332
Network Interface
Input / Output Interface
Processor(s)
322
324
320

400
402
412
414
416
Memory
Digital Assets
Authorization Model
Account Data
BUS
432
Network Interface
Input / Output Interface
Processor(s)
422
424
420

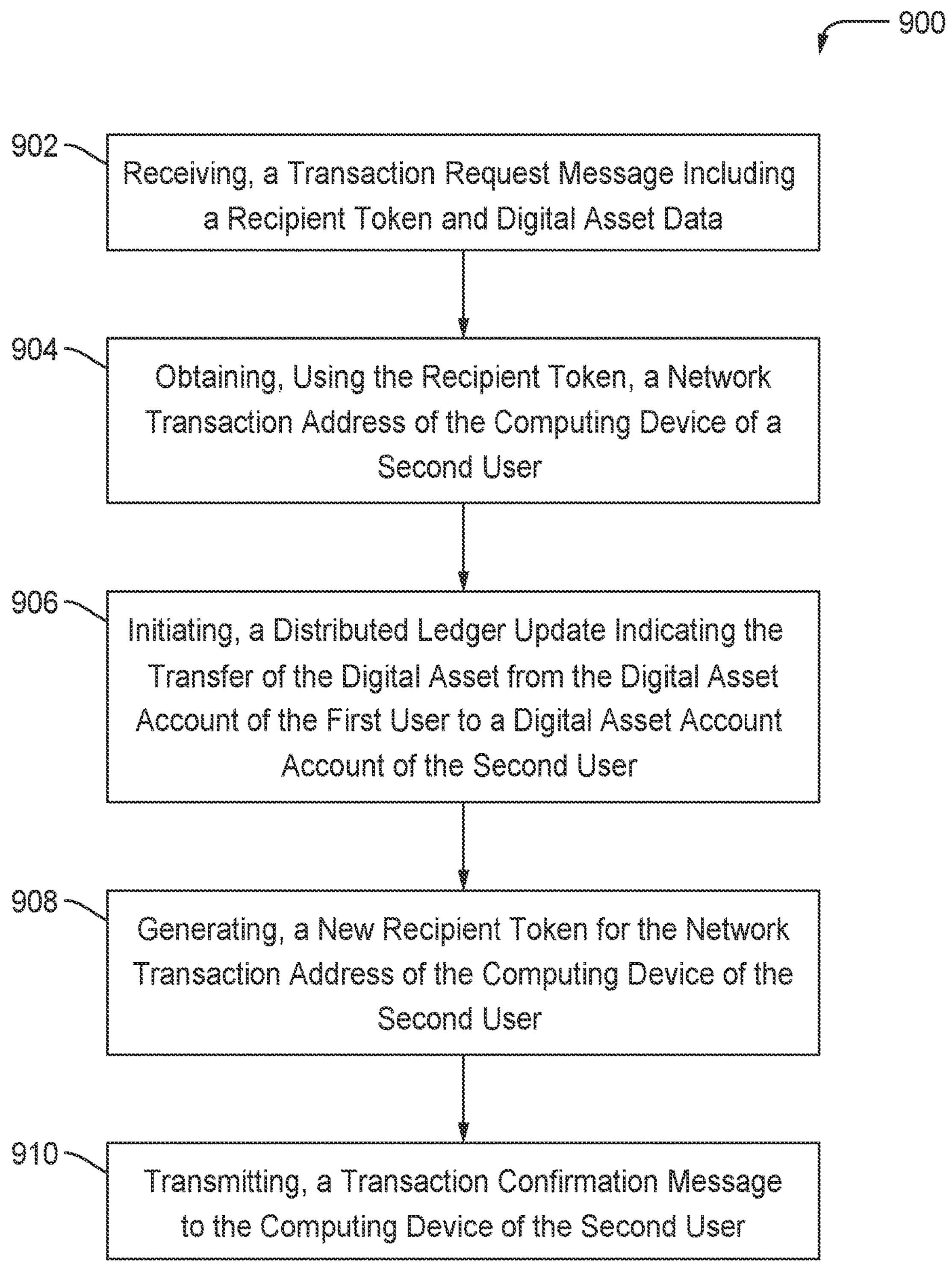
Fig. 9
900
902
Receiving, a Transaction Request Message Including a Recipient Token and Digital Asset Data
904
Obtaining, Using the Recipient Token, a Network Transaction Address of the Computing Device of a Second User
906
Initiating, a Distributed Ledger Update Indicating the Transfer of the Digital Asset from the Digital Asset Account of the First User to a Digital Asset Account Account of the Second User
908
Generating, a New Recipient Token for the Network Transaction Address of the Computing Device of the Second User
910
Transmitting, a Transaction Confirmation Message to the Computing Device of the Second User

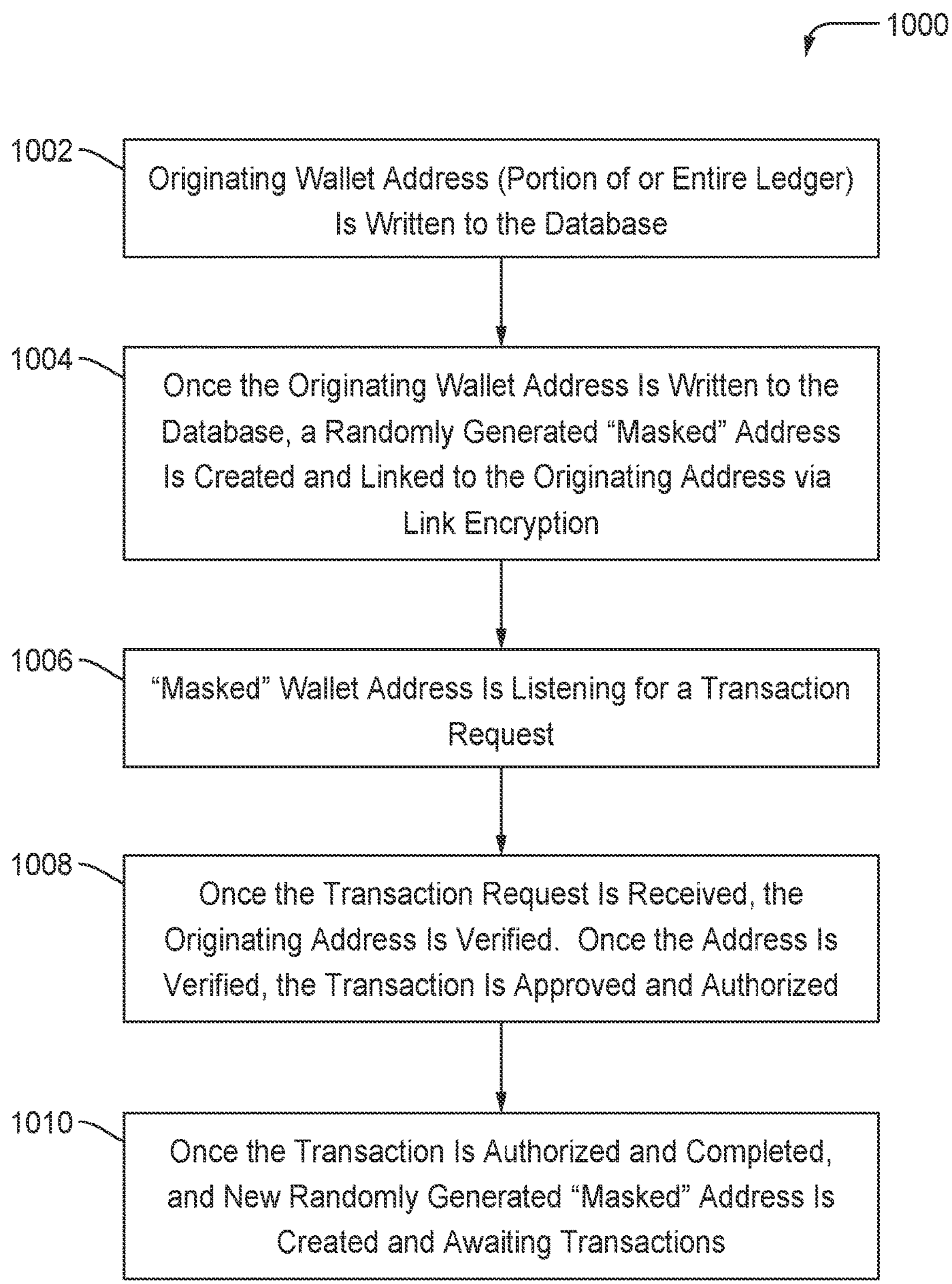
Fig. 10
1000
1002
Originating Wallet Address (Portion of or Entire Ledger) Is Written to the Database
1004
Once the Originating Wallet Address Is Written to the Database, a Randomly Generated "Masked" Address Is Created and Linked to the Originating Address via Link Encryption
1006
"Masked" Wallet Address Is Listening for a Transaction Request
1008
Once the Transaction Request Is Received, the Originating Address Is Verified. Once the Address Is Verified, the Transaction Is Approved and Authorized
1010
Once the Transaction Is Authorized and Completed, and New Randomly Generated "Masked" Address Is Created and Awaiting Transactions

DYNAMIC LEDGER ADDRESS MASKING

CROSS-REFERENCE TO RELATED APPLICATIONS

This application claims the benefit of priority form provisional application No. 63/106,229 entitled: Dynamic Ledger Address Masking" ad filed on Oct. 27, 2020; the entirety of which is herein incorporated by reference.

BACKGROUND OF THE INVENTION

Digital storage containers, often referred to as wallets, are used to store cryptographic currency and other records using ledger technologies. Private cryptographic keys are used to control access to wallets, reducing the likelihood that currency of records contained herein will be stolen. The loss of a cryptographic key often leads to the permanent loss of access to all currency or records stored within the wallet. To prevent the loss of private cryptographic keys, users may provide the key to a third party service for storage. If the user loses the key, they may request a copy form the third party service. However, such services often use standard password-based authentication techniques and may be susceptible efforts by malicious actors to obtain private keys of users. Other wallet users may store a copy of their private cryptographic key on a flash drive or other external storage. This technique is also problematic as the loss of the external storage medium may leave the user without a viable option for retrieving the contents of their wallet.

Thus, there is a need for a technical that enables transactions access to a digital wallet but reduces the need for a constant private cryptographic key for use in every wallet transaction, thereby reducing the likelihood of a malicious actor to transact as the user or prevent the user from making transactions with the wallet.

SUMMARY OF THE INVENTION

The various embodiments relate to systems, methods, and non-transitory, computer-readable media for implementing dynamic digital address masking in a distributed ledger environment. The various embodiments obfuscate the network address of a user's digital asset storage, such as a digital wallet, through tokenization of the network address. Tokens may be used to initiate digital asset transfers between users of the distributed ledger system.

In an embodiment, an issuer computer is described for implementing a dynamic digital address masking method. The issuer computer may include a processor, a network interface, and a memory coupled to the processor and having stored thereon, processor-executable instructions for performing operations. The operations may include receiving, via the network interface, from the computing device of a first user, a transaction request message including a recipient token and digital asset data, wherein the digital asset data indicates a digital asset to be transferred from a digital asset account of the first user to a digital asset account of a second user associated with the recipient token. The operations may also include obtaining, by the processor from the memory, using the recipient token, a network transaction address of the computing device of the second user, stored in a memory of the issuer computer. The issuer computer may then initiate, by the processor, a distributed ledger update indicating the transfer of the digital asset from the digital asset account of the first user to a digital asset account of the second user, wherein the digital account of the second user is located at the network transaction address obtained by the issuer computer using the recipient token. Further, the issuer computer may generate, by the processor a new recipient token for the network transaction address of the computing device of the second user, and transmitting, via the network interface, a transaction confirmation message to the computing device of the second user, including the new recipient token and at least a portion of the digital asset data.

Additional embodiments include methods, systems, and non-transitory computer-readable media for carrying out the operations performed by the issuer computer.

BRIEF DESCRIPTION OF THE DRAWINGS

FIG. 9 shows a process flow diagram illustrating an embodiment method for digital address masking in a digital transaction environment according to various embodiments.

FIG. 10 shows a process flow diagram illustrating an embodiment method for digital address masking in a financial transaction according to various embodiments.

DETAILED DESCRIPTION OF THE INVENTION

Figure 1:
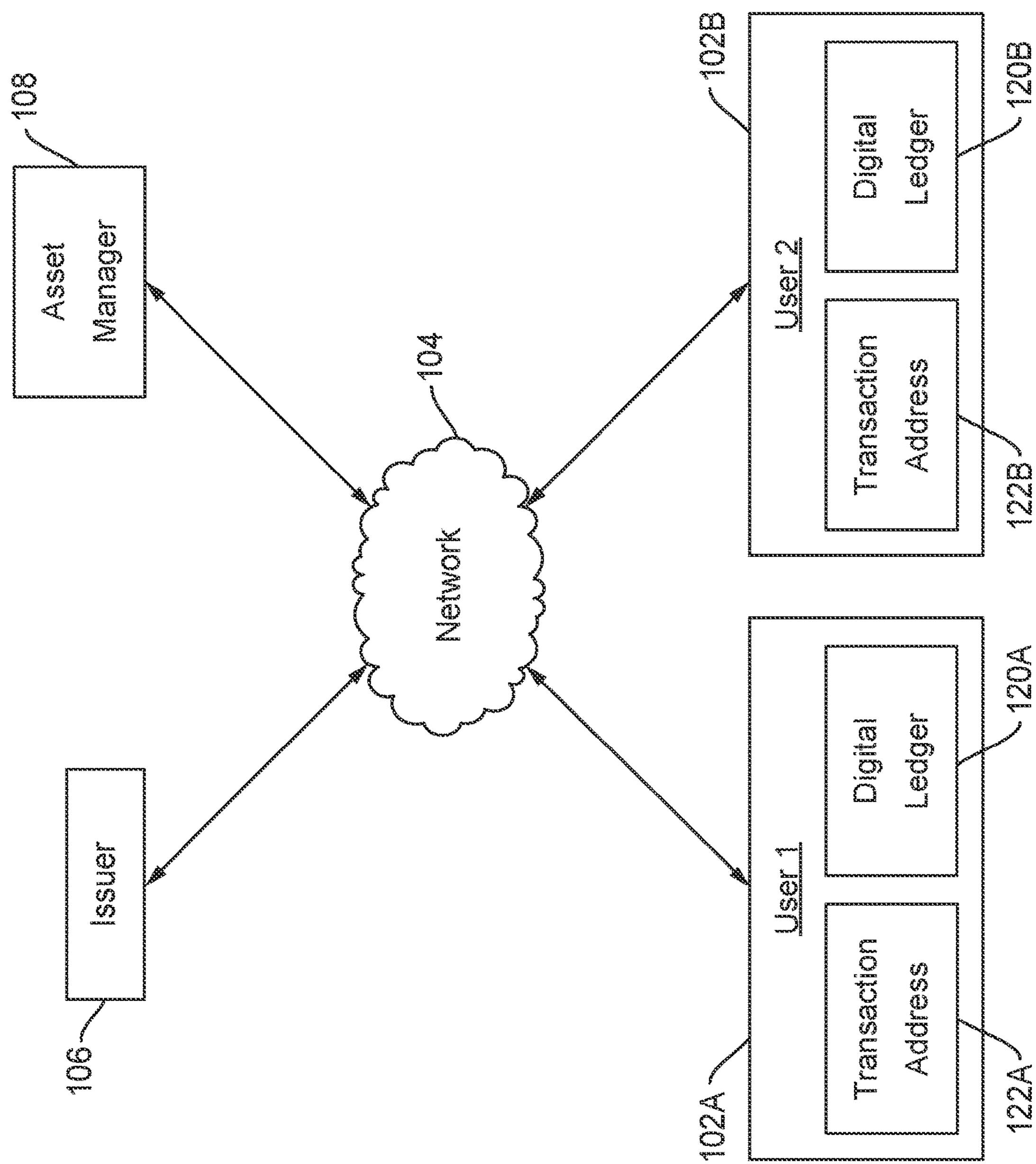
FIG. 1 shows a block diagram illustrating a system for implementing digital ledger dynamic address masking according to various embodiments.

Prior to discussing embodiments of the invention, some terms can be described in further detail.

A "key" may refer to digital information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include any encryption key that may be shared openly and publicly. The public key may be designed to be shared and may be configured such that any information encrypted with the public key may only be decrypted using an private key associated with the public key (i.e., a public/private key pair).

A "private key" may include any encryption key that may be protected and secure. For example, the private key may be securely stored at an entity that generates a public/private key pair and may be used to decrypt any information that has been encrypted with the associated public key of the public/private key pair.

An "issuer" may refer to a business entity that issues tokens for transaction addresses associated with users of a distributed ledger system. The issuer may optionally maintain a digital asset account for a user. An issuer may also issue payment credentials and a digital asset storage address stored on a user device, such as a cellular telephone, smart card, tablet, or laptop to the consumer.

An "asset manager" may refer to a generator or maintainer of digital assets. The asset manager may be a banking institution, a non-fungible token generator, inventory manager, or the like. The asset manager may store digital assets and transfer them to the digital asset storage of different users based on records of transfers entered into the distributed ledger system. As an example, an asset manager may be an entity that issues a unit of cryptocurrency to a user upon generation of a new unit.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "user device" may be any suitable device that can interact with a user (e.g., a payment card or mobile phone). A user device may communicate with or may be at least a part of an access device or a server computer. User devices may be in any suitable form. Some examples of user devices include POS devices, cellular phones, PDAs, personal computers (PCs), tablet PCs, wearable devices (e.g., smart watches), vehicles with communication capabilities (e.g., smart cars), etc.

A "user" may include an individual. In some embodiments, a user may be associated with one or more personal accounts and/or user devices.

A "ledger" may be a list of records which are linked and secured using cryptography. A grouping of a list of records may be called a block. A block may contain any relevant information, for example, a hash of a previous block, a timestamp, cryptocurrency transaction information, health records, goods ownerships, or responsibility, etc.

"Link encryption" may be network security technique in which data traffic is encrypted and decrypted at each point along the network path through which the data traffic travels.

A "token" may be a substitute value for a credential. A token may be a string of numbers, letters, or any other suitable characters. Examples of tokens include access tokens, personal identification tokens, etc.

"Tokenization" is a process by which data is replaced with substitute data. For example, an access token representing a ledger address for a digital wallet, may be replaced with a substitute number (e.g. a token) that may be associated with the access token.

Dynamic Address Masking System

FIG. 1 shows a block diagram of a system 100 comprising a number of components according to some embodiments of the invention. The system comprises user devices 102A and 1026, a network 104, an issuer computer 106, and an optional asset manager computer 108.

For simplicity of illustration, a certain number of components are shown in FIG. 1. It is understood, however, that embodiments of the invention may include more than one of each component. For example, there may be any number of issuer computers 106 or user devices 102.

The components in FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

A distributed ledger existing on one or more of the components shown in FIG. 1 may may store information relating to digital asset transactions of its users. In some embodiments, the distributed ledger may store user payment records or other digital asset transfer information in blocks in the distributed ledger. The digital assets associated with records stored in the distributed ledger may be financial in nature or may be related to goods tracking, medical or legal records, contracts, or the like. In some embodiments, multiple entities may store transaction records in the distributed ledger.

In some embodiments, the digital ledger 108 may have specific read and write permissions associated with each user or asset manager entity. For example, asset records generated by a first entity may only be able to be written by the first entity, but may be read by the first entity and other entities given permission to read. Read and write permissions may be added and altered by each respective entity.

The asset manager computer 108 may be a processing network computer in some embodiments. The processing network computer may be configured to provide authorization services, and clearing and settlement services for payment transactions. A processing network computer may include data processing subsystems, networks, and operations used to support and deliver authorization services, exception file services, and clearing and settlement services. Furthermore, the payment processing network may include a server computer and may use any suitable wired or wireless telecommunications network, including the Internet. Thus, the asset manager computer may be responsible for generating and/or maintaining digital assets, as well as processing requests for transfer of digital assets between the digital asset accounts of different users.

The issuer computer 106 may generate and maintain multiple recipient tokens. These recipient tokens are each mapped to a network address of the digital asset storage of a user. The recipient token may be provided to the user and stored on the distributed ledger. Each recipient token is generated by obfuscating, hashing, or otherwise modifying the network address to create a transaction address that is a substitute for the actual network address of the digital asset storage. That is, the recipient token may be a fake network address. An issuer computer 106 may receive this recipient token in a transaction request message from a user of user device 102A and may look up the actual network address of the digital asset storage of the user with whom the first user would like to transact. One or more issuer computers 106 may assist in receiving transaction request message from users, and forwarding the requests using the actual network address of a recipient. In this way, user-to-user transactions may be commenced, without providing any particular user with information that could be used to identify the location, or entity associated with the second user.

Figure 2:
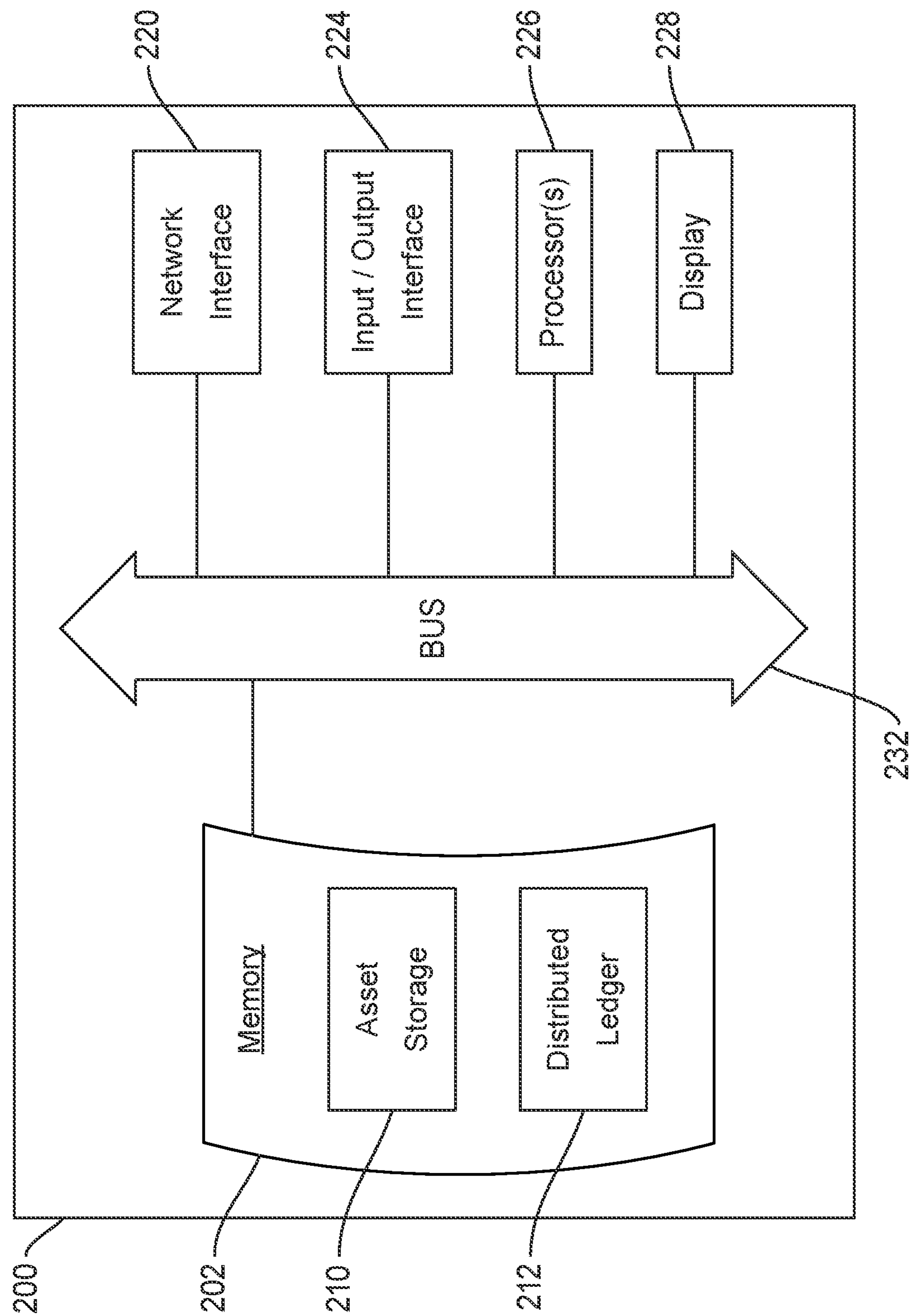
FIG. 2 shows a call flow diagram illustrating message flow for dynamic digital address masking according to various embodiments.

FIG. 2 shows a diagram illustrating an example user device according to an embodiment of the invention. FIG. 2 may be described in reference to a user engaging with a distributed ledger system in order to perform digital asset transfers. The user device 200 may represent any of user devices 102A or 102B, from FIG. 1. The user device 200 may have additional components and, or features according to various implementations of the disclosed embodiments. The illustrated components enable the described functionality of the dynamic address masking system, but are not intended to be limiting.

The user device 200 includes one or more processor(s) 226 (e.g., ASICs, digital signal processors (DSPs), etc.). That is, the processor 226 can be implemented as one or more integrated circuits (e.g., one or more single core or multicore microprocessors and/or microcontrollers), and is used to control the operation of user device 200. The processor 226 can execute a variety of programs in response to program code or computer-readable code stored in the system memory 202.

The memory 202 can be implemented using any combination of any number of non-volatile memories (e.g., flash memory) and volatile memories (e.g. DRAM, SRAM), EEPROM, or any other non-transitory storage medium, or a combination thereof media. Memory 202 may store a mobile operating system and a mobile application environment where one or more mobile applications reside (e.g. a digital asset storage 210, distributed ledger application 212, etc.) to be executed by the processor 226. Also, the memory 202 may store computer code, executable by the processor 226, for performing any of the functions described herein.

The memory 202 may also store a digital asset storage 210 and distributed ledger application 212, which may interface with one another to provide the user-side experience of the dynamic digital address masking system. For example, the digital asset storage 210 may enable the user to store digital assets such as NFTs, cryptocurrency, records, contracts, or the like. The distributed ledger application 212 may enable the user to access the information stored on the distributed ledger. That is, the user may read and/or write to the distributed ledger via an application programming interface (API) of the distributed ledger application 212. Further, either the distributed ledger application 212 or the digital asset storage 210 may facilitate the generation of transaction request messages to be sent to the issuer computer 106.

User device 200 also optionally includes one or more input/output (I/O) interface 224. Example I/O interfaces 224 may include a keyboard and mouse, a touchscreen, a microphone, and one or more buttons (e.g., volume or power buttons, etc.), which may be integrated into a display 240.

The user device 200 further includes one or more network interfaces 220 which may be wireless and wired. In an example, the communications interface 220 may be optional because some user devices 200 may be configured for wireless communication only). In an example embodiment, if made part of the user device 200, a wired component of network interface 220 may be used to support wired local connections to peripheral devices (e.g., a USB connection, a mini USB or lightning connection, a headphone jack, graphics ports such as serial, VGA, HDMI, DVI or DisplayPort, audio ports, and so on) and/or to a wired access network (e.g., via an Ethernet cable or another type of cable that can function as a bridge to the wired access network such as HDMI v1.4 or higher, etc.). In another example embodiment, the wireless component of the network interface 220 includes one or more wireless transceivers for communication in accordance with a local wireless communications protocol (e.g., WLAN or Wi-Fi, WiFi Direct, Bluetooth, etc.) and/or one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, LTE, 4G, 5G LTE, 5G NR or other protocols that may be used in a terrestrial wireless communication subscriber network). The various components of the user device 200 can communicate with each other via a bus 232.

Figure 3:
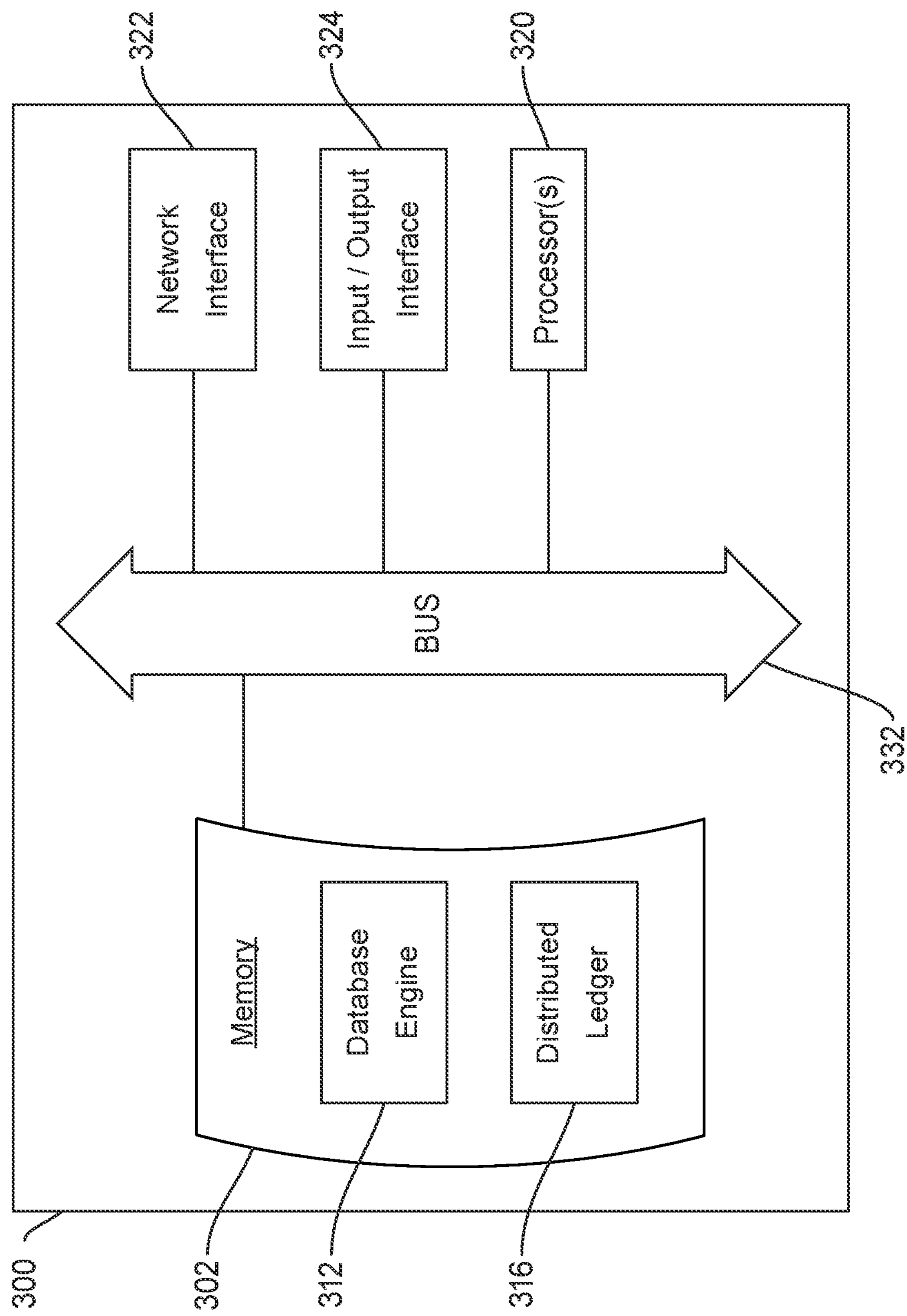
FIG. 3 shows a block diagram illustrating user computing device according to various embodiments.

The display 240 may be configured as a touchscreen display, and may be communicatively coupled to peripheral buttons such as a power control button, a volume or vibrate control button, an airplane mode toggle button, etc., and at least one front-panel button such as a Home button, among other components. While not shown explicitly as part of the user device 200, the display 240 can include one or more external antennas and/or one or more integrated antennas that are built into the external casing of the user device 200, including but not limited to Wi-Fi_33 antennas, cellular antennas, satellite position system (SPS) antennas (e.g., global positioning system (GPS) antennas), and so on FIG. 3 shows a block diagram illustrating an issuer computer 300 according to an embodiment of the invention. The issuer computer 300 may correspond to issuer computer 106, which hosts, supports, maintains, and manages the recipient tokens and actual network addresses of digital asset storage of distributed ledger participants. The issuer computer 300 may include multiple servers, computing devices, and network infrastructure components.

The issuer computer 300 includes a processor 320 coupled to a memory 302, which may include both volatile and non-volatile memory, such as a solid state, or disk drive. The service provider computing device 104 may also include a floppy disc drive, compact disc (CD) or DVD disc drive coupled to the processor 320. The issuer computer 300 may also include communication interface(s) 322 coupled to the processor 320 for establishing data connections with a network 104. An input/output (I/O) interface 322 may include output circuitry configured to present data and input circuitry configured to receive local user input. The various components of the issuer computer 300 may be communicatively coupled via system bus 326.

The memory 302 may be a computer-readable storage medium and may store a database engine 312 and a distributed ledger application 316. Database engine 312 may store the recipient tokens and actual network addresses of digital asset storage for various users of the distributed ledger system. Distributed ledger application 316 may enable the issuer computer to access, read, and or write to the distributed ledger.

Figure 4:
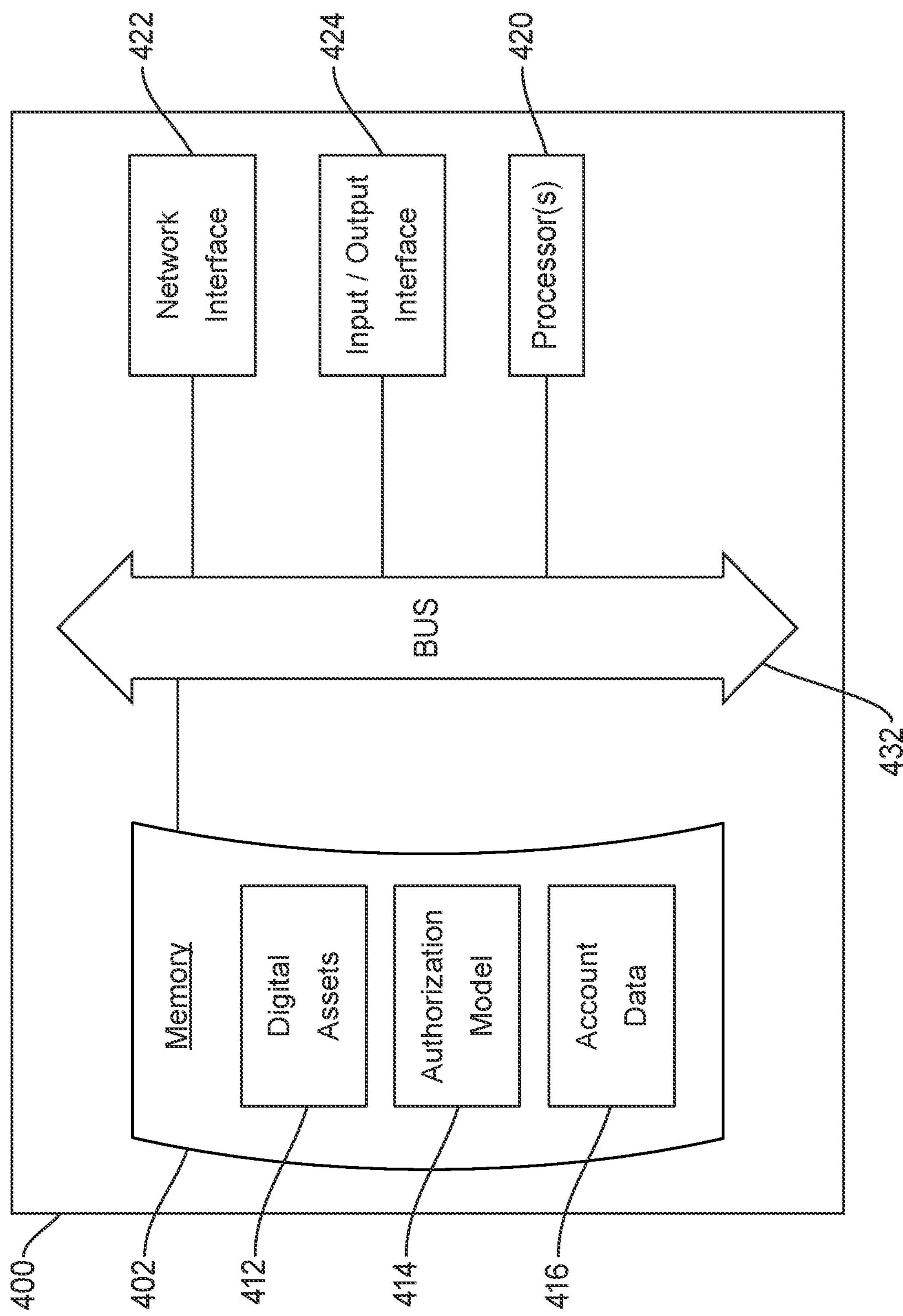
FIG. 4 shows a block diagram illustrating an issuer computer according to various embodiments.

FIG. 4 shows a block diagram illustrating an asset manager computer 400 according to an embodiment of the invention. The asset manager computer 400 may correspond to asset manager computer 108, which hosts, supports, maintains, and manages digital assets. The asset manager computer 400 may include multiple servers, computing devices, and network infrastructure components necessary to host the social media platform.

The asset manager computer 400 includes a processor 420 coupled to a memory 402, which may include both volatile and non-volatile memory, such as a solid state, or disk drive. The asset manager computer 400 may also include a floppy disc drive, compact disc (CD) or DVD disc drive coupled to the processor 420. The asset manager computer 400 may also include communication interface(s) 422 coupled to the processor 320 for establishing data connections with a network 104. An input/output (I/O) interface 422 may include output circuitry configured to present data and input circuitry configured to receive local user input. The various components of the content platform server 106 may be communicatively coupled via system bus 426.

The memory 402 may be a computer-readable storage medium and may store account data 416, a distributed ledger application 414, and digital assets 412 among other data components and applications. The account data 416 may store and maintain information in association with user digital asset account. Such information may include account names, profile descriptions, account identifiers, balance information, personally identifying information, digital assets owned by the user, etc. The digital assets 412 may be the various digital assets owned by users of the dynamic address masking system. This may include cryptocurrency, inventory NFTs, trading NFTs, contracts, records, media or other assets owned by users. A distributed ledger application 414 may enable or access, reading, and writing of the distributed ledger. By the asset management computer 300.

Transaction Flow

Figure 5:
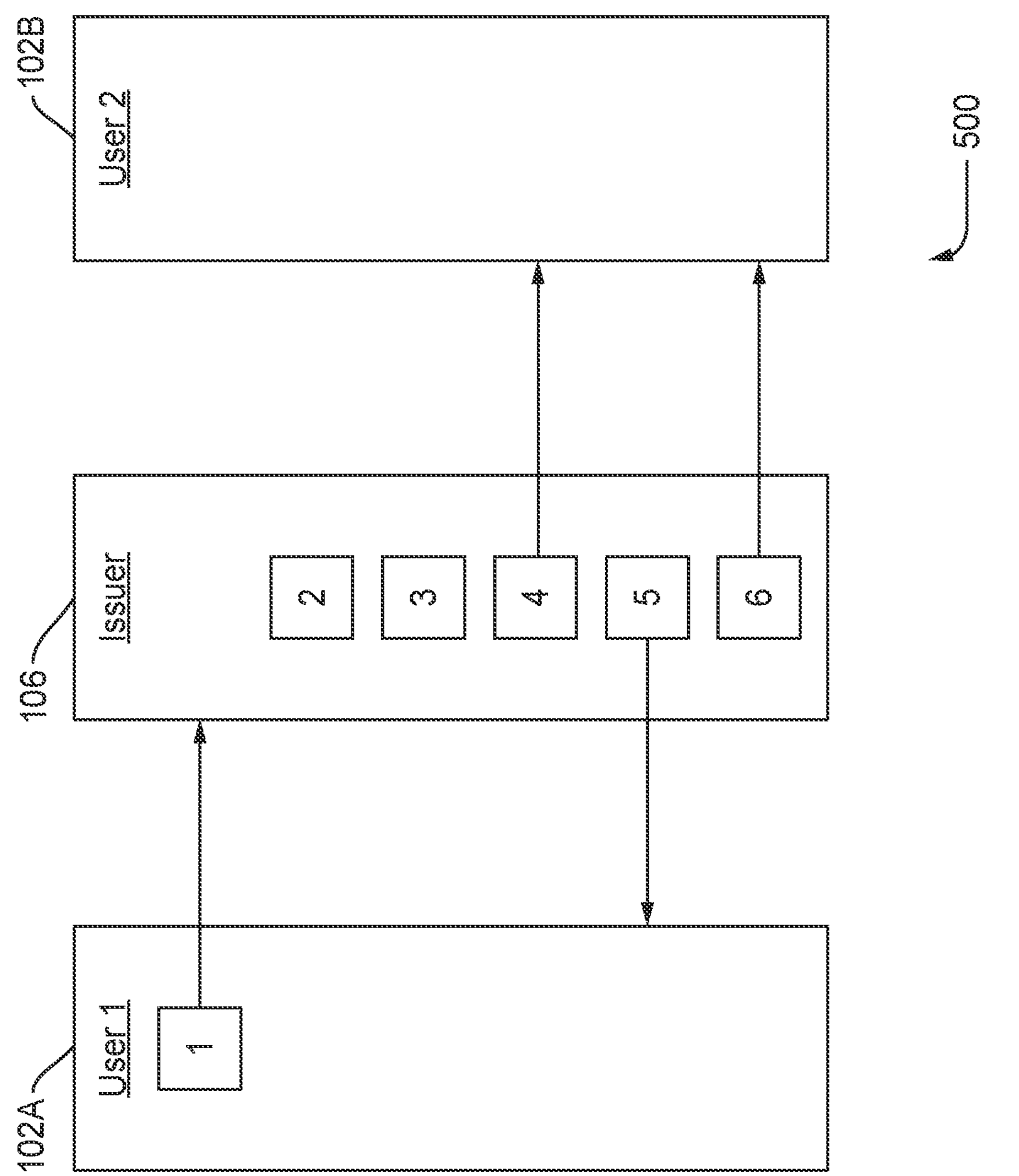
FIG. 5 shows a block diagram illustrating an asset manager computer according to various embodiments.

FIG. 5 shows a diagram illustrating a method according to an embodiment of the invention. FIG. 5 may be described in reference to a user performing a transaction in which they have previously stored currency in a wallet on the digital ledger. The wallet may be stored at and accessible via a reference address on the digital ledger. During provisioning of the wallet, the reference address may be tokenized to produce an access token. Access tokens may be a digital ledger address randomly generated from or checked against the space of all free (unassigned) digital ledger addresses. The access token is used to enable payment transactions without exposing the actual reference address of the user's wallet. New access tokens are issued after the completion of each transaction such that any malicious actor obtaining the access token would be unable to complete future transactions.

At step S202, the user device 102 may initiate a transaction with the host site 104A. The host site 104A may be a resource provider host site and may be associated with the resource provider computer 104. The user device 102 may transmit an identifier to the host site 104A. The identifier may identify the user of the user device 102. In some embodiments, the identifier may be associated with the user. For example, the identifier may be a name of the user. In some embodiments, the identifier may be a token reference ID.

At step S204, the host site 104A may transmit a transaction request message including the identifier to the secure gateway 106.

At step S206, after receiving the transaction request message, the secure gateway 106 may transmit a verification request message to the user. The verification request message may contain information for the user to input into the user device 102.

In some embodiments, the verification request message may include a one-time password and the access token, which may be stored locally on the user device 102. For example, the verification request message may be an email which includes the one-time password. In some embodiments, the secure gateway 106 may transmit the verification request message to the user device 102. For example, the user device may receive the verification request message and may display the verification request message to the user of the user device 102.

At step S208, the user may input the password and/or access token into the user device 102. The user device 102 may then transmit the access token and the password to the secure gateway 106. In some embodiments, the user device 102 may transmit a verification response message to the secure gateway 106, the verification response message in response to the verification request message.

At step S210, after receiving the verification response message from the user device 102, the secure gateway 106 may determine if the verification response message verifies the user of the user device 102. If the user's identity is verified, then the secure gateway 106 may access the digital ledger 108 using the access token. That is, the secure gateway 106 may attempt to access the digital ledger at the address specified by the access token. A computer hosting the digital ledger, such as an issuer computer, may access a database of reference address associations to identify the reference address associated with the access token. In some embodiments, the digital ledger 108 may be hosted on the same computer as or controlled by the same entity as the network computer 110. If the digital ledger 108 is not hosted on the same network computer 110, then the wallet information may be transmitted to the network computer 110 directly or via secure gateway 106.

At step S220, the network computer 110 may transmit a transaction decision to the user device 102. In some embodiments, the user device 102 may transmit the transaction decision to the host site 104A. If the transaction is approved, the network computer 110 may update the digital ledger to reflect the current balance of the user's wallet. The network computer 1110 may also generate a new access token for the wallet. The new access token is stored in the database in association with the actual reference address, replacing the previous access token. The access token may be randomly generated and may be selected from or checked against the remaining pool of unused digital ledger addresses.

At step S222, the network computer 110 may transmit a transaction decision message to the host site 104A. In some embodiments, the resource provider computer 104 may decrypt the transaction decision message. The resource provider computer 104 may then proceed with the transaction.

Figure 6:
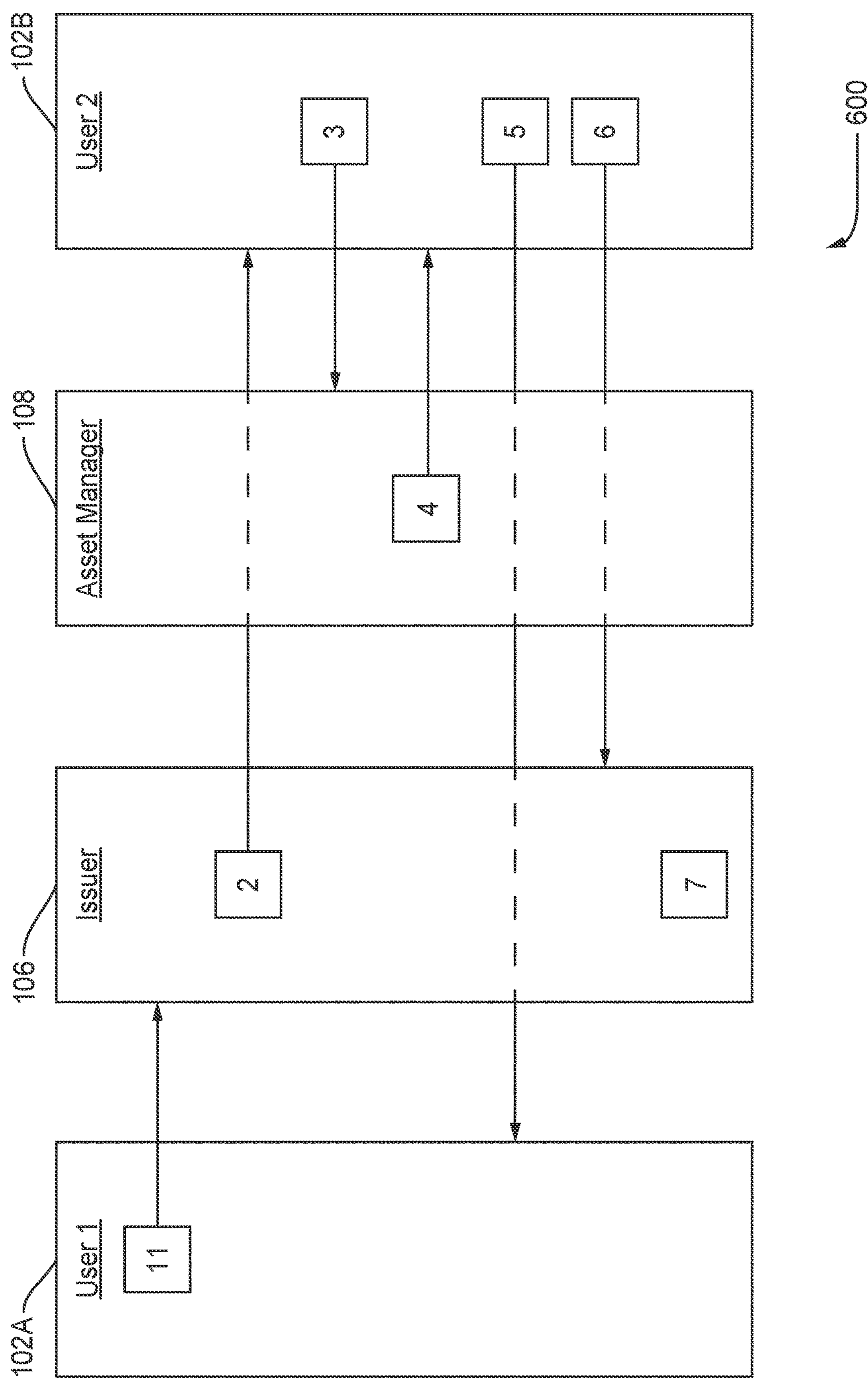
FIG. 6 shows a call flow diagram illustrating another embodiment message flow for dynamic digital address masking according to various embodiments.

FIG. 6 shows a diagram illustrating a provisioning and enrollment method according to an embodiment of the invention. The user of the user device 102 may proceed to enroll a new wallet with an issuer such as a bank, card issuer, or cryptocurrency issuer.

At step S302, the user device 102 may transmit a request to activate a new wallet to an authorizing entity computer 112.

At step S304, the authorizing entity computer 112 may enroll the user of the user device 102. The authorizing entity computer 112 may transmit the request and user identifying information to the network computer 110. The network computer 110 may use this information to generate a new wallet stored on the digital ledger 108.

At step S306, after generating a new wallet, the network computer 110 may store the new wallet on the digital ledger 108.

At step S308, the network computer 110 may receive an enrollment confirmation message from the digital ledger 108. The enrollment confirmation message may include a message indicating success or failure of enrollment and a reference address for the wallet. The reference address may be tokenized and stored on the network computer 110. The network computer 110 may use the reference address of the wallet on the digital ledger 108 as a seed for a random address generator and then check the resulting address against the pool of available digital ledger addresses to ensure that the result is not already in use. This process may be repeated until an available address is found. As an alternative to using the reference address as a seed, a clock time may also be used. Alternatively, the network computer 110 may select n address from the pool of available addresses without random address generation. Once a transaction is complete and a new access token is generated, the prior access token is released back to the pool of available digital ledger addresses.

At step S310, the network computer 110 may transmit the enrollment confirmation message to the user device 102. In some embodiments, the network computer 110 may transmit the enrollment confirmation message and the access token to the authorizing entity computer 112, which may optionally transmit the access token to the user device 102.

Figure 7:
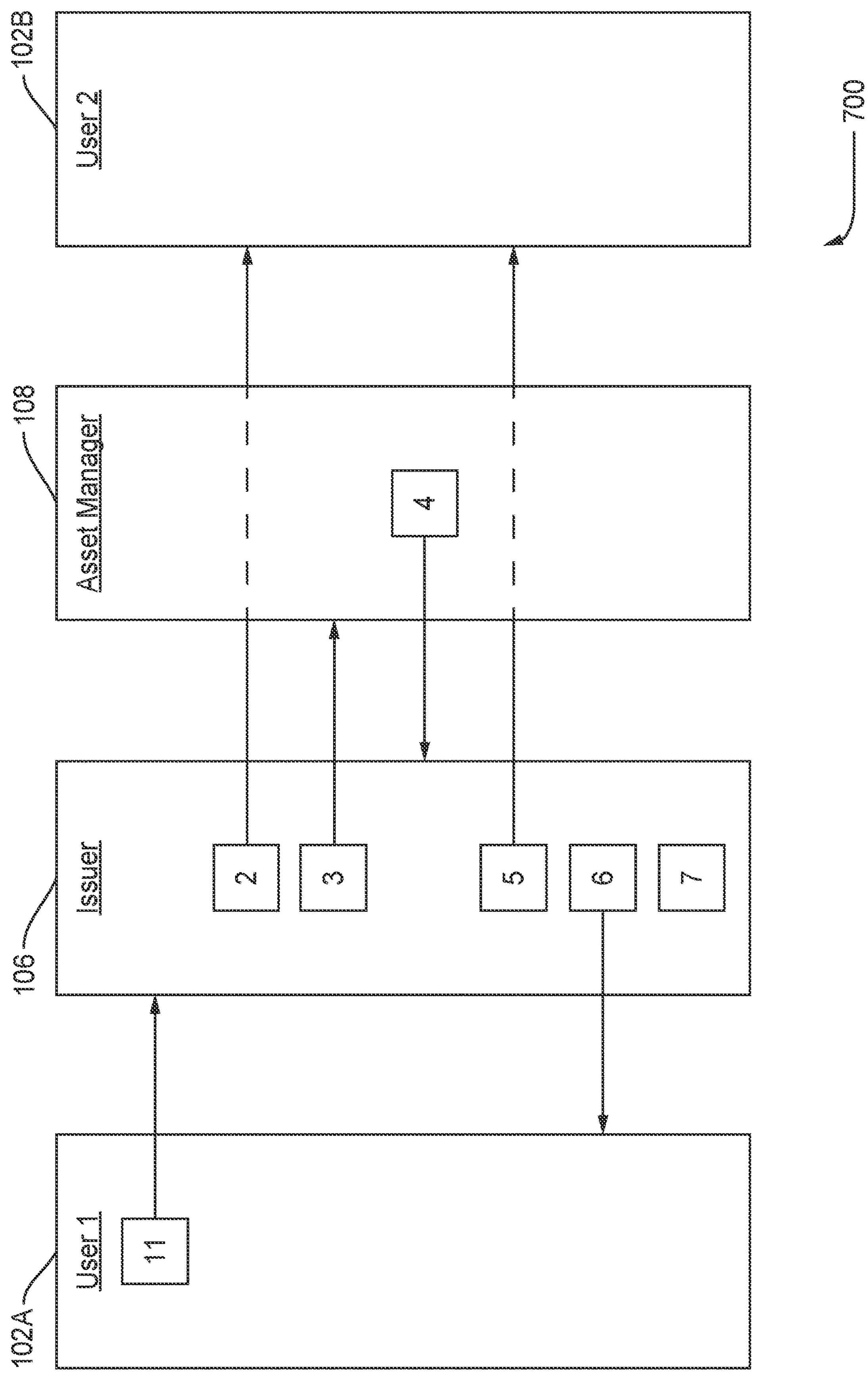
FIG. 7 shows a call flow diagram illustrating yet another embodiment message flow for dynamic digital address masking according to various embodiments.

FIG. 7 shows a diagram illustrating a provisioning and enrollment method according to an embodiment of the invention. The user of the user device 102 may proceed to enroll a new wallet with an issuer such as a bank, card issuer, or cryptocurrency issuer.

General Method Framework

Figure 8:
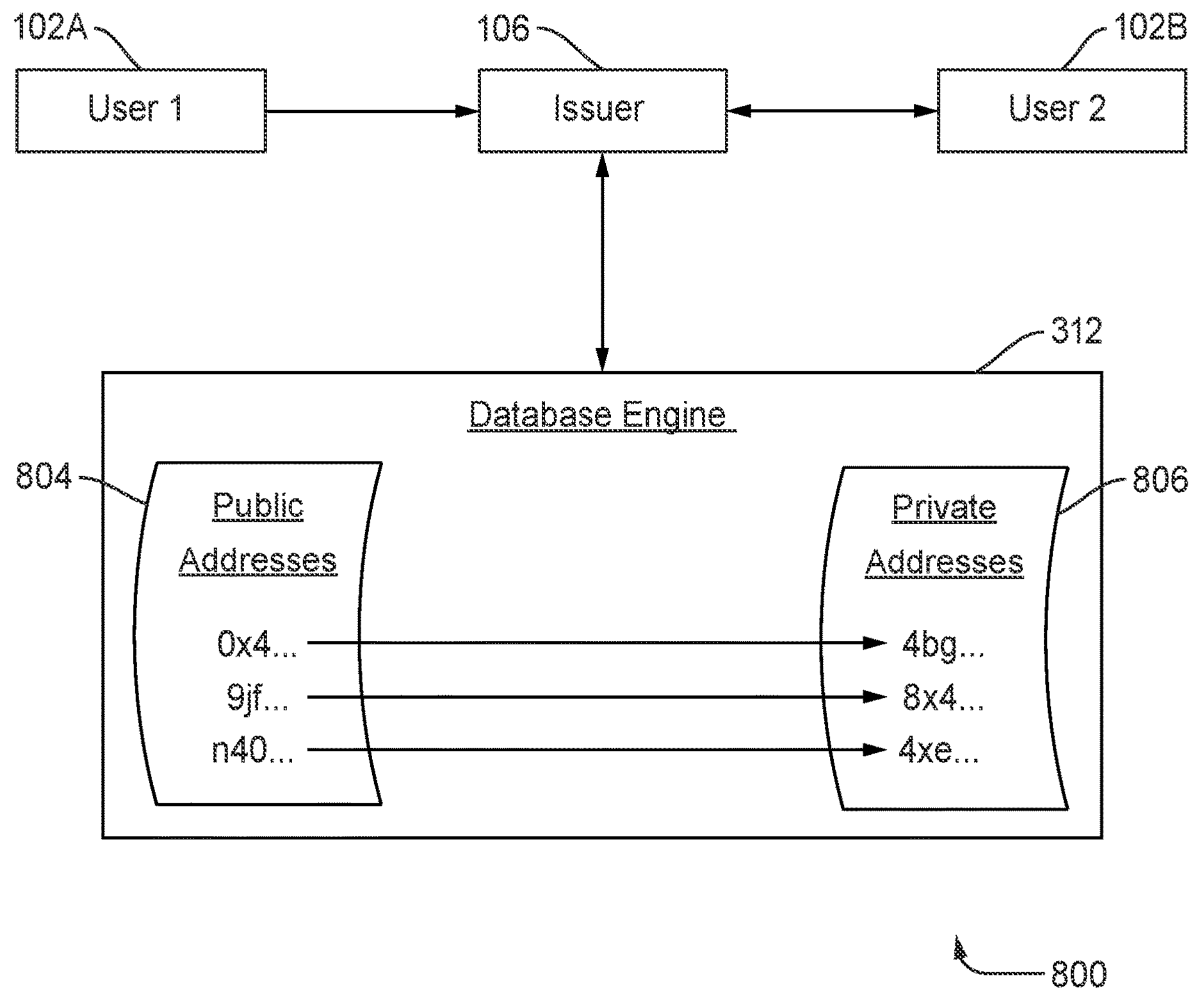
FIG. 8 shows a block diagram illustrating transaction address masking by an issuer device according to various embodiments.

FIG. 8 shows a diagram illustrating a general framework of dynamic address masking using an issuer compute according to an embodiment of the invention. In FIG. 8,:

- User 1 initiates a transaction to User 2's public address
- The private address is verified as the intended target of the transaction through the payment gateway
- Once User 2's address is verified on the ledger, and the transaction is verified, the transaction proceeds
- Once the transaction is complete, a new public address is selected at random and linked to the private address for User 2
- Event-driven automation is also in place on the private address side for dynamic addresses using derivative keys/hierarchical deterministic wallets
- The public addresses are selected from a "wallet garden" (bank of addresses)
- The public address is also changed at random intervals
- The database engine contains 2 databases—1 for public addresses and 1 for private addresses
- Event-driven automation is built in to the transaction flow and to the database engine for dynamically changing addresses
- The rows in the databases are a 1-to-1 mapping. That mapping is done via dblink between the databases
- dblink is a method for creating an ecrypted link between content in 2 different databases The dynamic digital address masking system provides a technical solution to the problem that government entities and financial institutions have expressed regarding the broad adoption of cryptocurrency and digital ledger technologies as a means of secure record keeping. The primary issue expressed by these institutions is the use of blockchain technology and cryptocurrency to promote criminal/nefarious activity. The present address masking system addresses these concerns with the technical solution of dynamic wallet address reassignment after every transaction.

A portion of addresses on the ledger can be pruned and written to the database, or the entire ledger can be written to the database.

Once the wallet addresses are written to the database, a randomly generated "masked" address is substituted for the originating wallet address. The randomly generated "masked" wallet address is listening for transactions and is the only address in this workflow that is publicly accessible/visible.

Once the transaction request is received by the "masked" address, the originating address is verified through Link Encryption. Once the originating address is verified, the transaction is authorized and completed.

Upon completion of the transaction, a new randomly generated "masked" address is created and placed in front of the originating address and is again listening for transactions.

Issue resolution: alleviates the traditional use of Bitcoin and Ethereum wallet addresses that are statically placed by sellers on Darknet Markets selling illicit goods. Because the masked address is regenerated after every successful transaction, it is impossible for these sellers to statically post their addresses on these markets to sell their illicit goods.

Issue resolution 2: hosting medical records on the blockchain with a theoretically "unbreakable" and fully secure means Issue resolution 3: prevention of voter fraud by protecting voter identities using the same mechanisms of security Issue resolution 4: Universal usage of storage sensitive data on blockchain ledgers for governments, financial institutions, decentralized finance, and ownership of goods.

FIG. 9 shows a process flow diagram of an exemplary method for dynamic address masking to an embodiment of the invention. The method 800 may be implemented on the various components illustrated in FIG. 1 of the dynamic address masking system.

In block 902, the issuer computer may receive from the computing device of a first user, a transaction request message including a recipient token and digital asset data, wherein the digital asset data indicates a digital asset to be transferred from a digital asset account of the first user to a digital asset account of a second user associated with the recipient token. The recipient token has the form of an address on the distributed ledger.

In block 904, the issuer computer may obtain using the recipient token, a network transaction address of the computing device of the second user, stored in a memory of the issuer computer.

In block 906, the issuer computer may initiate a distributed ledger update indicating the transfer of the digital asset from the digital asset account of the first user to a digital asset account of the second user, wherein the digital account of the second user is located at the network transaction address obtained by the issuer computer using the recipient token. This may include generating, by the issuer computer, a distributed ledger entry indicating the removal of the digital asset for the digital asset account of the first user and generating a distributed ledger entry indicating the addition of the digital asset to the digital asset account of the second user. Further, this may include transmitting a distributed ledger update including the generated distributed ledger entries to at least one of the computing device of the first user or the computing device of the second user.

In block 908, the issuer computer may generate, a new recipient token for the network transaction address of the computing device of the second user.

In block 910, the issuer computer may transmit a transaction confirmation message to the computing device of the second user, including the new recipient token and at least a portion of the digital asset data.

Optionally, the method 900 may further include determining, by the issuer computer, whether to authorize the transfer of the digital asset indicated by the digital asset data, from the digital asset account of the first user to the digital asset account of the second user, based on a comparison of the digital asset data to the digital asset account of the first user. In another alternative, the method 900 may include transmitting, by the issuer computer to an asset manager computer, an authorization request including the digital asset data and an identifier of the first user and performing initiating, by the issuer computer, a distributed ledger update indicating the transfer of the digital asset from the digital asset account of the first user to a digital asset account of the second user, in response to receiving an authorization confirmation from the asset manager computer.

FIG. 10 shows a diagram illustrating a general flow of a method according to an embodiment of the invention.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. An issuer computer for performing digital transaction address masking comprising:
- a processor;
- a network interface;
- and a memory coupled to the processor and having stored thereon, processor-executable instructions for performing operations comprising:
  - providing a distributed ledger comprising a plurality of digital asset accounts, wherein each digital asset account is associated with a corresponding network address and a plurality of recipient tokens each mapped to each corresponding network address;
  - generating, by the processor, a recipient token, wherein the recipient token is generated by modifying a recipient network address that is mapped to the recipient token to create a masked address, wherein the masked address is a transaction address that is a substitute for the recipient network address;
  - receiving, via the network interface, from a computing device of a first user communicatively connected to the issuer computer, a transaction request message including a recipient token and digital asset data, wherein the digital asset data indicates a digital asset to be transferred from a digital asset account of the first user to a digital asset account of a second user associated with the generated recipient token;
  - obtaining, by the processor from the memory, using the recipient token, a second user network transaction address of a computing device of the second user, stored in a memory of the issuer computer;
  - verifying, by the processor, the transaction request with the second user, wherein verifying further comprises:
    - transmitting, to the second user using the second user network transaction address, a request for verification;
    - receiving, from the second user, a response to the request for verification; and
    - verifying the transaction request as a function of the response to the request for verification;
  - performing a transfer of the digital asset from the digital asset account of the first user to the digital asset account of a second user;
  - initiating, by the processor, a distributed ledger update indicating the transfer of the digital asset from the digital asset account of the first user to a digital asset account of the second user, wherein the digital account of the second user is located at the second user network transaction address;

generating, by the processor a new recipient token for the second user network transaction address of the computing device of the second user, wherein generating further comprises:

receiving a seed based on at least one of a reference address associated with the digital asset account of the first user and a clock time;

randomly generating the new recipient token using the seed; and verifying that the new recipient token is not in a pool of used recipient tokens;

randomly generating, by the processor, an origination masked address, wherein the origination masked address substitutes an originating network address for a digital asset account of the first user, wherein the originating wallet address is a portion of the distributed ledger;

verifying the originating network address through link encryption;

transmitting, via the network interface, a transaction confirmation message to the computing device of the second user, including the new recipient token, the verified originating network address and at least a portion of the digital asset data;

iteratively generating the origination masked address as a function of each new transaction, wherein the random masked address is created and substitutes the originating network address; and releasing, in response to transmitting the transaction confirmation message and generating the new recipient token, the recipient token into a pool of available recipient tokens.

2. The issuer computer of claim 1, wherein the recipient token has a form of an address on the distributed ledger, and further comprising:

randomly generating the new recipient token using the clock time; and posting the new recipient token to the distributed ledger.

3. The issuer computer of claim 1, wherein initiating, by the issuer computer, the distributed ledger update indicating the transfer of the digital asset from the digital asset account of the first user to the digital asset account of the second user includes:

generating, by the processor, a distributed ledger entry indicating a removal of the digital asset from the digital asset account of the first user; and generating, by the processor, a distributed ledger entry indicating an addition of the digital asset to the digital asset account of the second user.

4. The issuer computer of claim 3, the processor-executable instructions further comprising:

transmitting, via the network interface, a distributed ledger update including the generated distributed ledger entries to at least one of the computing device of the first user or the computing device of the second user.

5. The issuer computer of claim 1, the processor-executable instructions further comprising:

determining, by the processor, whether to authorize the transfer of the digital asset indicated by the digital asset data, from the digital asset account of the first user to the digital asset account of the second user, based on a comparison of the digital asset data to the digital asset account of the first user.

6. The issuer computer of claim 1, the processor-executable instructions further comprising:

transmitting, via the network interface to an asset manager computer, an authorization request including the digital asset data and an identifier of the first user.

7. The issuer computer of claim 6, the processor-executable instructions further comprising:

performing initiating, by the issuer computer, a distributed ledger update indicating the transfer of the digital asset from the digital asset account of the first user to a digital asset account of the second user, in response to receiving an authorization confirmation from the asset manager computer.

8. A method of digital transaction address masking comprising:

providing a distributed ledger comprising a plurality of digital asset accounts, wherein each digital asset account is associated with a corresponding network address and a plurality of recipient tokens each mapped to each corresponding network address;

generating, by a processor, a recipient token, wherein the recipient token is generated by modifying a recipient network address that is mapped to the recipient token to create a masked address, wherein the masked address is a transaction address that is a substitute for the recipient network address;

receiving, by an issuer computer from the computing device of a first user communicatively connected to the issuer computer, a transaction request message including a recipient token and digital asset data, wherein the digital asset data indicates a digital asset to be transferred from a digital asset account of the first user to a digital asset account of a second user associated with the generated recipient token;

obtaining, by the issuer computer, using the recipient token, a second user network transaction address of the computing device of the second user, stored in a memory of the issuer computer;

verifying, by the processor, the transaction request with the second user, wherein verifying further comprises:

transmitting, to the second user using the second user network transaction address, a request for verification;

receiving, from the second user, a response to the request for verification; and verifying the transaction request as a function of the response to the request for verification;

performing a transfer of the digital asset from the digital asset account of the first user to the digital asset account of a second user;

initiating, by the issuer computer, a distributed ledger update indicating the transfer of the digital asset from the digital asset account of the first user to a digital asset account of the second user, wherein the digital account of the second user is located at the second user network transaction address;

generating, by the processor, a new recipient token for the second user network transaction address of the computing device of the second user, wherein generating further comprises:

receiving a seed based on at least one of a reference address associated with the digital asset account of the first user and a clock time;

randomly generating the new recipient token using the seed; and verifying that the new recipient token is not in a pool of existing recipient tokens;

randomly generating, by the processor, an origination masked address, wherein the origination masked address substitutes an originating network address for a digital asset account of the first user, wherein the originating network address is a portion of the distributed ledger; and verifying the originating network address through link encryption;

transmitting, by the issuer computer, a transaction confirmation message to the computing device of the second user, including the new recipient token, the verified originating network address and at least a portion of the digital asset data;

iteratively generating the origination masked address as a function of each new transaction, wherein the random masked address is created and substitutes the origination network address; and releasing, in response to transmitting the transaction confirmation message and generating the new recipient token, the recipient token into a pool of available recipient tokens.

9. The method of claim 8, wherein the recipient token has the form of an address on the distributed ledger, and further comprising:

randomly generating the new recipient token using the clock time; and posting the new recipient token to the distributed ledger.

10. The method of claim 8, wherein initiating, by the issuer computer, the distributed ledger update indicating the transfer of the digital asset from the digital asset account of the first user to the digital asset account of the second user includes:

generating, by the issuer computer, a distributed ledger entry indicating a removal of the digital asset from the digital asset account of the first user; and generating, by the issuer computer, a distributed ledger entry indicating an addition of the digital asset to the digital asset account of the second user.

11. The method of claim 10, further comprising:

transmitting, by the issuer computer, a distributed ledger update including the generated distributed ledger entries to at least one of the computing device of the first user or the computing device of the second user.

12. The method of claim 8, further comprising determining, by the issuer computer, whether to authorize the transfer of the digital asset indicated by the digital asset data, from the digital asset account of the first user to the digital asset account of the second user, based on a comparison of the digital asset data to the digital asset account of the first user.

13. The method of claim 8, further comprising:

transmitting, by the issuer computer to an asset manager computer, an authorization request including the digital asset data and an identifier of the first user.

14. The method of claim 13, further comprising:

performing initiating, by the issuer computer, a distributed ledger update indicating the transfer of the digital asset from the digital asset account of the first user to a digital asset account of the second user, in response to receiving an authorization confirmation from the asset manager computer.

15. A non-transitory computer-readable medium having stored thereon, processor-executable instructions for performing operations for digital transaction address masking comprising:

providing a distributed ledger comprising a plurality of digital asset accounts, wherein each digital asset account is associated with a corresponding network address and a plurality of recipient tokens each mapped to each corresponding network address;

generating, by the processor, a recipient token, wherein the recipient token is generated by modifying a recipient network address that is mapped to the recipient token to create a masked address, wherein the masked address is a transaction address that is a substitute for the recipient network address;

receiving, via the network interface, from a computing device of a first user communicatively connected to the issuer computer, a transaction request message including the recipient token and digital asset data, wherein the digital asset data indicates a digital asset to be transferred from a digital asset account of the first user to a digital asset account of a second user associated with the generated recipient token;

obtaining, by the processor from the memory, using the recipient token, a second user network transaction address of a computing device of the second user, stored in a memory of the issuer computer;

verifying, by the processor, the transaction request with the second user, wherein verifying further comprises:

transmitting, to the second user using the second user network transaction address, a request for verification;

receiving, from the second user, a response to the request for verification; and verifying the transaction request as a function of the response to the request for verification;

performing a transfer of the digital asset from the digital asset account of the first user to the digital asset account of a second user;

initiating, by the processor, a distributed ledger update indicating the transfer of the digital asset from the digital asset account of the first user to the digital asset account of the second user, wherein the digital asset account of the second user is located at the second user network transaction address;

generating, by the processor, a new recipient token for the second user network transaction address of the computing device of the second user, wherein generating further comprises:

receiving a seed based on at least one of the reference address associated with the digital asset account of the first user and a clock time;

randomly generating the new recipient token using the seed; and verifying that the new recipient token is not in a pool of used recipient tokens;

randomly generating, by the processor, an origination masked address, wherein the origination masked address substitutes an originating network address for a digital asset account of the first user, wherein the originating wallet address is a portion of the distributed ledger;

verifying the originating network address through link encryption;

transmitting, via the network interface, a transaction confirmation message to the computing device of the second user, including the new recipient token, the verified origination network address and at least a portion of the digital asset data;

iteratively generating the origination masked address as a function of each new transaction, wherein the random masked address is created and substitutes the origination network address; and releasing, in response to transmitting the transaction confirmation message and generating the new recipient token, the recipient token into a pool of available recipient tokens.

16. The non-transitory computer-readable medium of claim 15, wherein the recipient token has the form of an address on the distributed ledger, and further comprising:

randomly generating the new recipient token using the clock time; and posting the new recipient token to the distributed ledger.

17. The non-transitory computer-readable medium of claim 15, wherein initiating, by the issuer computer, the distributed ledger update indicating the transfer of the digital asset from the digital asset account of the first user to the digital asset account of the second user includes:

generating, by the issuer computer, a distributed ledger entry indicating a removal of the digital asset from the digital asset account of the first user; and generating, by the issuer computer, a distributed ledger entry indicating an addition of the digital asset to the digital asset account of the second user.

18. The non-transitory computer-readable medium of claim 17, the processor-executable instructions further comprising:

transmitting, by the issuer computer, a distributed ledger update including the generated distributed ledger entries to at least one of the computing device of the first user or the computing device of the second user.

19. The non-transitory computer-readable medium of claim 15, the processor-executable instructions further comprising:

determining, by the issuer computer, whether to authorize the transfer of the digital asset indicated by the digital asset data, from the digital asset account of the first user to the digital asset account of the second user, based on a comparison of the digital asset data to the digital asset account of the first user.

20. The non-transitory computer-readable medium of claim 15, the processor-executable instructions further comprising:

transmitting, by the issuer computer to an asset manager computer, an authorization request including the digital asset data and an identifier of the first user; and performing initiating, by the issuer computer, a distributed ledger update indicating the transfer of the digital asset from the digital asset account of the first user to a digital asset account of the second user, in response to receiving an authorization confirmation from the asset manager computer.

* * * * *